(12) United States Patent
Stock et al.

(10) Patent No.: US 10,046,429 B2
(45) Date of Patent: Aug. 14, 2018

(54) SYSTEM HAVING AT LEAST ONE POWER TOOL AND HAVING AT LEAST ONE MOBILE SENSOR DEVICE

(71) Applicant: Robert Bosch GmbH, Stuttgart (DE)

(72) Inventors: Joern Stock, Wernau (DE); Florian Esenwein, Leinfelden-Echterdingen (DE); Joachim Schadow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/383,259

(22) Filed: Dec. 19, 2016

(65) Prior Publication Data
US 2017/0173749 A1 Jun. 22, 2017

(30) Foreign Application Priority Data

Dec. 21, 2015 (DE) ........................ 10 2015 226 190

(51) Int. Cl.
| | | |
|---|---|---|
| G08B 1/08 | (2006.01) |
| G08B 21/00 | (2006.01) |
| G05B 19/02 | (2006.01) |
| B23Q 11/00 | (2006.01) |
| B23Q 17/12 | (2006.01) |
| G08B 21/02 | (2006.01) |
| B25F 5/00 | (2006.01) |
| B23Q 17/09 | (2006.01) |

(52) U.S. Cl.
CPC ...... *B23Q 11/0082* (2013.01); *B23Q 17/0952* (2013.01); *B23Q 17/12* (2013.01); *B25F 5/006* (2013.01); *G08B 21/02* (2013.01)

(58) Field of Classification Search
CPC .... A61B 2562/0219; A61B 5/11; G01H 1/00; G01H 3/14
USPC .................... 340/539.11, 4.36, 680
See application file for complete search history.

(56) References Cited

U.S. PATENT DOCUMENTS

| 7,578,193 B2 * | 8/2009 | Davidson | B66F 17/003 73/661 |
| 9,524,591 B2 * | 12/2016 | Coste | G07C 3/08 |
| 2005/0000998 A1 * | 1/2005 | Grazioli | B25B 27/0085 227/2 |
| 2006/0185434 A1 * | 8/2006 | Bernhagen | G01H 3/14 73/649 |
| 2009/0040061 A1 * | 2/2009 | Golunski | G07C 3/08 340/683 |

(Continued)

FOREIGN PATENT DOCUMENTS

| DE | 38 19 050 A1 | 12/1989 |
| DE | 103 15 980 A1 | 11/2003 |
| DE | 10 2008 055 057 A1 | 6/2010 |

(Continued)

*Primary Examiner* — Emily C Terrell
(74) *Attorney, Agent, or Firm* — Maginot, Moore & Beck LLP

(57) ABSTRACT

A system includes at least one power tool having at least one sensor unit. The system further includes at least one mobile sensor device. The at least one mobile sensor device has at least one communication unit configured to communicate with the at least one power tool. The system further includes at least one computing unit configured to compare measurement data of the at least one sensor unit of the at least one power tool and of the at least one mobile sensor device.

12 Claims, 3 Drawing Sheets

(56) References Cited

U.S. PATENT DOCUMENTS

2009/0091465 A1* 4/2009 Buckingham ............ A61B 5/11
                                                                340/683
2017/0014984 A1* 1/2017 Rola ........................ B25F 5/00

FOREIGN PATENT DOCUMENTS

| DE | 10 2009 027 587 A1 | 1/2011 | | |
|----|---------------------|--------|---|---|
| DE | 10 2012 200 819 A1 | 7/2013 | | |
| DE | 10 2013 002 251 A1 | 8/2013 | | |
| DE | 10 2014 209 009 A1 | 7/2015 | | |
| GB | 2411472 A * | 8/2005 | ............... | A61B 5/11 |
| WO | WO 2010041059 A2 * | 4/2010 | ............... | G01H 3/14 |

* cited by examiner

SYSTEM HAVING AT LEAST ONE POWER TOOL AND HAVING AT LEAST ONE MOBILE SENSOR DEVICE

This application claims priority under 35 U.S.C. § 119 to patent application no. DE 10 2015 226 190.5 filed on Dec. 21, 2015 in Germany, the disclosure of which is incorporated herein by reference in its entirety.

BACKGROUND

A system having at least one power tool and having at least one mobile sensor device has already been proposed.

SUMMARY

The disclosure proposes a system having at least one power tool, in particular a hand-held power tool, that has at least one sensor unit, having at least one mobile sensor device, which has at least one communication unit that is designed to communicate with the power tool, and having at least one computing unit that is designed to compare measurement data of the at least one sensor unit of the power tool and of the at least one mobile sensor device. Preferably, the at least one computing unit is designed to effect data fusion of measurement data of the at least one sensor unit of the power tool and of the at least one mobile sensor device. Preferably, the computing unit is designed to perform a plausibility check of the measurement data, by comparing the measurement data of the at least one sensor unit of the power tool and of the at least one mobile sensor device. A plausibility check can be used, in particular, to deduce correctness and accuracy of the measurement data. Preferably, at least one sensor, for sensing at least one operator-specific characteristic quantity, is disposed in the mobile sensor device, the power tool and the mobile sensor device preferably being able to communicate with each other, for example by means of radio technology or the like. Particularly preferably, operator-specific characteristic quantities, which are sensed by means of the sensor in the mobile sensor device, are used to control the power tool by open-loop and/or closed-loop control. For example, the pulse, noise emissions, vapors, gas, for example $CO_2$ or the like, dust particles, vibration emissions, accelerations, movement characteristics, body posture, hold of the power tool or the like can be measured and documented by means of the sensor in the mobile sensor device. Moreover, advantageously, further characteristic quantities can be determined by combining the measurement data of the at least one sensor unit of the power tool and of the at least one mobile sensor device. Preferably, the system makes it possible to achieve, in particular, sensing of operator-specific characteristic quantities and evaluation thereof, taking account of a history, environmental characteristic quantities, appliance characteristic quantities or the like, for the purpose of identifying, in particular predictively identifying, avoiding, or the like, work situations that may result in impairment to the health of the operator. Moreover, in principle, the inclusion of further measurement data such as, for example, further devices present in an environment, would also be conceivable. For example, an environmental characteristic value such as, for example, an ambient temperature, an air humidity or the like may be obtained from further devices.

A "power tool" is to be understood here to mean, in particular, a machine for performing work on workpieces and/or vegetation, such as, for example, grass, branches or the like. Further, a "hand-held power tool" in this context is to be understood to mean, in particular, a machine for performing work on workpieces, but advantageously a power drill, a hammer drill and/or percussion hammer, a saw, a plane, a screwdriver, a router, a sander, an angle grinder, a garden appliance and/or a multifunction tool. Furthermore, a "sensor unit" in this context is to be understood to mean, in particular, a unit that comprises at least one sensor. A "sensor" in this context is to be understood to mean, in particular, a unit provided to pick up at least one characteristic quantity and/or a physical characteristic, the pick-up being able to be effected actively, such as, in particular, by generating and emitting an electrical measuring signal, and/or passively, such as, in particular, by sensing changes in characteristic of a sensor component. Various sensors, considered appropriate by persons skilled in the art, are conceivable.

Further, in this context a "mobile sensor device" is to be understood to mean, in particular, a sensor device designed to be worn by a user during operation. Wearing in this case may be effected both directly, such as, in particular, in a hand of the operator, or indirectly, such as, in particular, by means of an item of clothing worn by an operator and/or by means of an appliance held by an operator. Preferably, the mobile sensor device comprises an energy storage means such as, in particular, a storage battery, for supplying electrical power during mobile operation. Preferably, the mobile sensor device is realized as a wearable computer, considered appropriate by persons skilled in the art, such as, for example, as a part of a smartwatch and/or a smartband. A "sensor device" in this case is to be understood to mean, in particular, a device that comprises at least one sensor. Furthermore, in this context a "communication unit" is to be understood to mean, in particular, a unit designed to provide, in particular cordless, communication with the power tool. Preferably, for the purpose of communicating with the power tool, the communication unit has at least one interface. Preferably, a communication unit is to be understood to mean, in particular, a unit designed for exchanging data. In particular, the communication unit has at least one information input and at least one information output. Preferably, the communication unit has at least two information inputs and at least two information outputs, at least one information input and at least one information output in each case being designed for connection to a physical system, in particular the power tool. Particularly preferably, it is to be understood to mean an interface between at least two physical systems, such as, in particular, between the power tool and the mobile sensor device. Various communication units, considered appropriate by persons skilled in the art, are conceivable, but in particular this is to be understood to mean a wireless interface such as, for example, Bluetooth, in particular according to the Standard 4.0 Low Energy, WLAN, in particular according to the Standard 801.11n, Zigbee, NFC, RFID, GSM, LTE or UMTS, and/or a wire-bound interface such as, for example, a USB connection.

A "computing unit" in this case is to be understood to mean, in particular, a unit having an information input, an information processing system and an information output. Advantageously, the computing unit has at least one processor, a storage memory, input and output means, further electrical components, an operating program, closed-loop control routines, open-loop control routines and/or calculation routines. Preferably, the components of the computing unit are disposed on a common printed circuit board and/or, advantageously, disposed in a common housing. "Designed" is to be understood to mean, in particular, specially programmed, configured and/or equipped. That an object is designed for a particular function is to be understood to mean, in particular, that the object fulfils and/or executes this particular function in at least one application state and/or operating state.

The design of the system according to the disclosure makes it possible to ensure, in particular, an advantageously high degree of operator safety. In particular, an advantageous monitoring of operation can be achieved by the comparison of measurement data of the at least one sensor unit of the power tool and of the at least one mobile sensor device. In particular, advantageously, disturbance influences on the sensors can be taken into account. Thus, for example, disturbance influences that act on the mobile sensor device from the power tool can be taken into account and advantageously subtracted. Preferably, the comparison of measurement data according to the disclosure, or the data fusion of the said characteristic quantities, makes it possible to initiate measures that provide for a high degree of working safety. In this way, the working safety is preferably actively monitored, and also considered in a preventative, anticipatory manner. For example, if operator fatigue is indicated, actions can be initiated in order that hazards do not occur in the first place.

It is additionally proposed that the at least one mobile sensor device be designed to be disposed at least partly on an operator, for the purpose of sensing operator data, in at least one operating state. Preferably, the at least one mobile sensor device is designed to be disposed at least partly on an operator, for the purpose of sensing vital data of the operator. Preferably, in addition, data of an operator are already stored on the mobile sensor device. Preferably, the at least one mobile sensor device is designed to be disposed on an extremity such as, in particular, an arm, of an operator. Particularly preferably, for this purpose the at least one mobile sensor device has, in particular, a fastening unit such as, in particular, an arm-band. "Operator data" in this context are to be understood to mean, in particular, personal characteristic quantities. Preferably, they are to be understood to mean, in particular, vital values of an operator and/or data of a behavior of an operator, such as, for example, a direction and/or a location of an application of force of the operator. Various operating data, considered appropriate by persons skilled in the art, are conceivable, such as, in particular, an operating burden, for example in the form of a noise burden and/or an oscillation burden, a pulse of an operator, a body temperature of an operator, a fatigue characteristic quantity of an operator, an alignment characteristic quantity and/or a movement characteristic quantity such as, in particular, acceleration. Moreover, from the frequency that the muscle system has when in tension, it is possible to deduce, in particular, whether the muscle, or the muscle system, is overloaded. In medicine, a distinction is made, in particular, between twitching, also called fasciculation, and trembling, also called tremor. Twitching denotes the rhythmical movement, which cannot be deliberately influenced, by which one or more body parts and body functions may be affected. The involuntary movement is caused by the contraction of mutually counteracting muscle groups, in particular antagonistic muscles. An increased tremor may occur—usually temporarily—as a result of the influence of cold, stress, exhaustion, alcohol and other influencing factors. This can preferably be sensed by means of the at least one mobile sensor device, making it possible, in particular, to deduce, for example, exhaustion. Over-burdening of the operator may also be detected if a pulse is exceeded during working with the power tool. The system can determine the pulse of the operator, for example, over the working day. Preferably, personal data, such as weight, age, BMI, medical records or the like, depending on availability, can also be evaluated. Preferably, the system can determine, from the sensed data, what a healthy pulse is, and when the pulse attains a critical value for the operator. A "fastening unit" in this context is to be understood to mean, in particular, a unit provided to fasten the mobile sensor device to an operator. Preferably, it is to be understood to mean, in particular, a unit realized such that it can be detachably connected an operator. Various fastening units, considered appropriate by persons skilled in the art, are conceivable. It is thereby possible, in particular, to ensure an advantageously high degree of operator safety. In particular, advantageously, this makes it possible to monitor a condition of an operator. Advantageously, a high degree of convenience for the operator can be provided as a result.

Furthermore, it is proposed that the at least one sensor unit of the at least one power tool be designed to sense machine data. Preferably, the at least one sensor unit of the power tool is designed to sense at least one operating characteristic quantity of the power tool. "Machine data" in this context are to be understood to mean, in particular, characteristic quantities of the power tool during operation. Preferably, they are to be understood to mean, in particular, characteristic quantities of a drive unit of the power tool, such as, for example, a currently applied load, a current rotational speed and/or a current torque, and/or general characteristic quantities of the power tool, such as, for example, a current vibration, oscillations, accelerations and/or temperature of the power tool, and/or other characteristic quantities of the power tool, considered appropriate by persons skilled in the art. It is thereby possible, in particular, to ensure an advantageously high degree of operator safety. In particular, advantageously, it is thereby possible to monitor a condition of the power tool. Moreover, in the case of simultaneous sensing of operator data, reconciliation of the data can be performed. Redundant data sensing is made possible. This makes it possible to achieve particularly reliable sensing of the data.

It is additionally proposed that the at least one sensor unit of the power tool and the at least one mobile sensor device each have at least one sensor, which is designed to sense a vibration characteristic quantity. Preferably, the sensors are each constituted by a vibration sensor. Various vibration sensors, considered appropriate by persons skilled in the art, are conceivable, such as, for example, piezoelectric vibration sensors. In principle, however, it would also be conceivable for the at least one sensor of the at least one sensor unit of the power tool and/or of the at least one mobile sensor device to be constituted by an acceleration sensor that, in addition to sensing an acceleration, is designed to sense vibrations. Preferably, the sensor of the at least one sensor unit of the power tool is designed to compose vibrations acting on a housing and/or a handle of the power tool. Particularly preferably, the sensor is at least a mobile sensor device for sensing vibrations acting on an operator, in particular on an arm of an operator. It is thereby possible, in particular, to ensure an advantageously high degree of operator safety. In particular, an advantageous monitoring of operation can be achieved by the comparison of the measurement data of the at least one sensor unit of the power tool and of the at least one mobile sensor device. Furthermore, in addition, reliable conclusions, concerning a current condition of the operator, can also be drawn from a change in the measurement data relative to each other. For example, if it is found, from a data fusion of accelerations and/or vibrations on the power tool and/or vibrations on the operator, in particular on an arm of the operator, that there is a change, or divergence, a reason may be that the user no longer has the strength necessary to safely hold the power tool, and consequently the vibrations from the power tool transfer strongly elsewhere, and as a consequence the risk of injury increases. If, for example, a vibration characteristic quantity decreases at the mobile sensor device while working with the power tool remains constant, it may be concluded that the operating strength to hold the machine is decreasing. It is also conceivable, for example, that movements by a flaccid muscle system are absorbed and/or damped differently the operator. As a measure, safety settings, for example, such as, in particular, kickback, torques or the like, could be set in such a manner that these settings respond at an early stage, or the power tool can only continue to be operated in a restricted operating mode, in particular an emergency operating mode, or also cannot be operated at all, by the operator.

It is further proposed that the at least one computing unit be designed, in at least one operating state, to check a plausibility of the measurement data of the at least one sensor unit of the power tool and of the sensor device. Preferably, checking of a plausibility of the measurement data of the at least one sensor unit of the power tool is effected on the basis of the measurement data of the mobile sensor device. Preferably, checking of a plausibility of the measurement data of the at least one mobile sensor device is effected on the basis of the measurement data of the at least one sensor unit of the power tool. Particularly preferably, the at least one computing unit is designed to perform a plausibility check of the measurement data. Particularly preferably, data, items of sensor information of the power tool, in combination with data of the mobile sensor device, can be used for a plausibility check. It is also conceivable, however, that evaluation of the data of the mobile sensor device is performed. It is thereby possible, in particular, to ensure an advantageously high degree of operator safety. Moreover, the checking of the plausibility of the measurement data of the at least one sensor unit of the power tool and of the at least one mobile sensor device makes it possible, in particular, to achieve advantageous monitoring of operation. In addition, the checking of the plausibility of the measurement data also enables operating errors of the operator to be detected.

It is additionally proposed that the at least one sensor unit of the power tool and the at least one mobile sensor device be designed for redundant sensing of operating data. Preferably, this is to be understood to mean, in particular, that at least some of the sensed operating data is sensed both by the sensor unit of the power tool and by the at least one mobile sensor device. The redundant sensing of the operating data makes it possible, advantageously, to check a plausibility of the measurement data of the at least one sensor unit of the power tool and/or of the at least one mobile sensor device. This, in turn, advantageously makes it possible to a high degree of operating safety and a high degree of operator safety.

Furthermore, it is proposed that the computing unit be designed to deduce a position of a hand of an operator in dependence on the measurement data of the at least one sensor unit of the power tool and/or of the at least one mobile sensor device. Preferably, the at least one computing unit is designed, in particular, to use the measurement data of the at least one sensor unit of the power tool and/or of the at least one mobile sensor device to check for a correct positioning of a hand of an operator. In particular, two-handed operation can also be monitored, advantageously, by means of a second mobile sensor device, each of the mobile sensor devices being worn, respectively, on a wrist. It is thereby possible, in particular, to ensure an advantageously high degree of operator safety. In particular, it is thereby possible to monitor proper operation of the power tool. Moreover, in this case it would additionally be conceivable for safety settings to be changed in the case of incorrect operation, to enable operator safety to be ensured despite the incorrect use. As a measure, safety settings, for example, such as, in particular, kickback, torques or the like, could be set in such a manner that these settings respond at an early stage, or the power tool can only continue to be operated in a restricted operating mode.

It is additionally proposed that the at least one computing unit be designed to adjust safety settings of the at least one power tool in dependence on the measurement data of the at least one sensor unit of the power tool and/or of the at least one mobile sensor device. Preferably, the at least one computing unit is designed, in particular, to evaluate the measurement data for the purpose, in particular, of predictively identifying and avoiding work situations that may result in impairment to the health of the operator. Particularly preferably, the at least one computing unit is designed, in particular, to evaluate a history of the measurement data for the purpose, in particular, of predictively identifying and avoiding work situations that may result in impairment to the health of the operator. Conceivable in this connection are various safety settings of the at least one power tool, considered appropriate by persons skilled in the art, such as, for example, the sensitivity of sensing of a kickback, a maximum torque and/or a maximum rotational speed. If it is detected, for example, that there is a decline in attentiveness and/or operating strength—for example because of fatigue—and/or if a high vibration burden on the operator is identified, a sensitivity of a kickback function, for example, could be set in such a manner that this function responds at an early stage, and/or a maximum torque and/or a maximum rotational speed of the power tool can be limited in such a manner that only restricted operation remains possible. It is thereby possible, in particular, to ensure an advantageously high degree of operator safety. In particular, this makes it possible, advantageously, to ensure an advantageously high degree of operator safety even in the case of at least partly incorrect operation and/or in the case of operator fatigue.

It is further proposed that the at least one power tool comprise the at least one computing unit. This makes it possible, in particular, to achieve reliable control of the power tool. Moreover, in particular, this enables the computing unit to be disposed such that the computing unit, in particular, is reliably supplied with energy and is reliably protected against external influences. In particular, it can thereby be achieved that the power tool can be operated only when the computing unit is active. In principle, however, a different disposition of the computing unit, considered appropriate by persons skilled in the art, would also be conceivable, such as, for example, in the mobile sensor device.

The disclosure is additionally based on a mobile sensor device of the system. It is proposed that the mobile sensor device have at least one arm-band for fastening to an arm of an operator. Preferably, the arm-band is realized, as least partly, as a silicone arm-band. The arm-band in this case may be realized both such that it itself is fully closed in the circumferential direction, and closed by means of a further unit such as, for example, a housing unit. Preferably, the arm-band is designed, in particular, to be directly fastened to an extremity, in particular an arm, of an operator. In particular, this enables the mobile sensor device to be disposed in a reliable manner on an operator. In principle, however, it would also be conceivable for the mobile sensor device, instead of having the arm-band, to have a ring, a glove or the like for fastening on an operator.

Furthermore, the disclosure is based on a method for operating the system. It is proposed that the at least one computing unit of the system compare measurement data of the at least one sensor unit of the power tool and of the at least one mobile sensor device. Preferably, the at least one computing unit performs, in particular, a data fusion of measurement data of the at least one sensor unit of the power tool and of the at least one mobile sensor device. Preferably, the computing unit performs a plausibility check of the measurement data by comparing measurement data of the at least one sensor unit of the power tool and of the at least one mobile sensor device. A plausibility check can be used, in particular, to deduce correctness and accuracy of the measurement data. Moreover, further characteristic quantities can be determined, advantageously, by combination of the measurement data of the at least one sensor unit of the power tool and of the at least one mobile sensor device. Preferably, the method makes it possible to achieve, in particular, sensing of operator-specific characteristic quantities and evaluation thereof, taking account of a history, environmental characteristic quantities, appliance characteristic quantities or the like, for the purpose of identifying, in particular predictively identifying, avoiding, or the like, work situations that may result in impairment to the health of the operator. In particular, owing to the design of the method according to the disclosure, an advantageously high degree of operator safety can be ensured. In particular, an advantageous monitoring of operation can be achieved by the comparison of measurement data of the at least one sensor unit of the power tool and of the at least one mobile sensor device. Preferably, the comparison of measurement data according to the disclosure, or the data fusion of the said characteristic quantities, enables measures to be implemented by which a high degree of working safety is made possible. In this way, the working safety is preferably monitored actively and also considered in a preventative, predictive manner. For example, if fatigue is indicated, actions can be initiated in order that hazards do not occur in the first place.

It is additionally proposed that safety settings of the at least one power tool of the system be adjusted in dependence on the measurement data of the at least one sensor unit of the power tool and/or of the at least one mobile sensor device. Preferably, the at least one computing unit evaluates measurement data for the purpose, in particular, of predictively identifying and avoiding work situations that may result in impairment to the health of the operator. Particularly preferably, the at least one computing unit evaluates, in particular, a history of the measurement data for the purpose, in particular, of predictively identifying and avoiding work situations that may result in impairment to the health of the operator, and, in dependence thereon, adjusts the safety settings. It is thereby possible, in particular, to ensure an advantageously high degree of operator safety. In particular, this makes it possible, advantageously, to ensure an advantageously high degree of operator safety even in the case of at least partly incorrect operation and/or in the case of operator fatigue.

The system according to the disclosure, the mobile sensor device and the method in this case are not intended to be limited to the application and embodiment described above. In particular, the system according to the disclosure, the mobile sensor device and the method may have individual elements, components and units that differ in number from a number stated herein, in order to fulfill a principle of function described herein.

BRIEF DESCRIPTION OF THE DRAWINGS

Further advantages are disclosed by the following description of the drawing. The drawing shows an exemplary embodiment of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
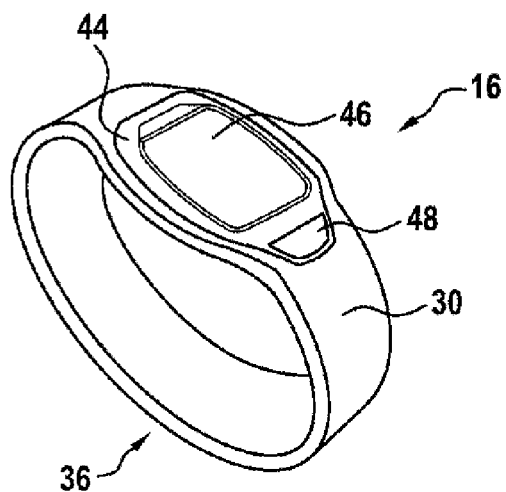
FIG. 1 illustrates a mobile sensor device of a system, with a sensor and with a communication unit, in a schematic representation.
Figure 3:
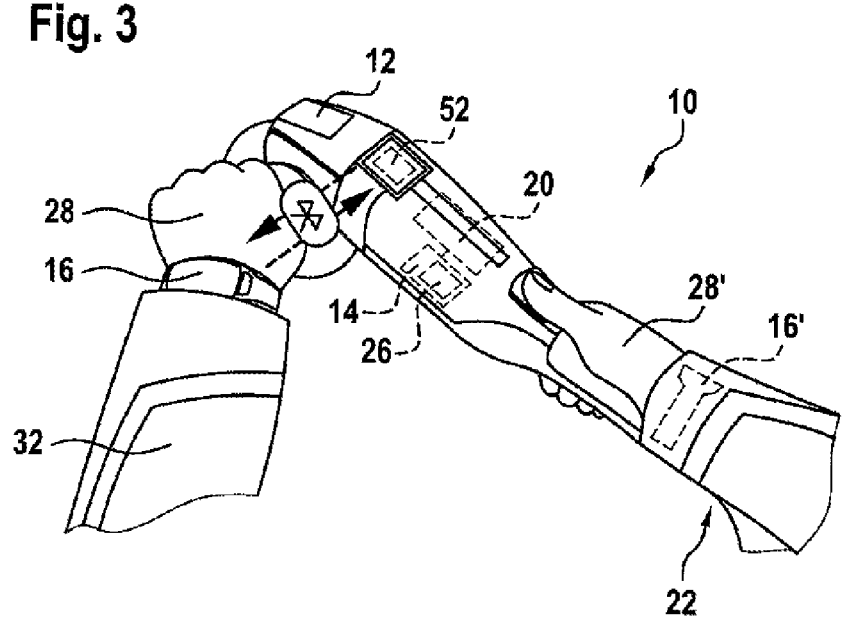
FIG. 3 illustrates the system with the mobile sensor device and with a power tool that has a sensor unit, in a schematic representation.

FIG. 1 shows a mobile sensor device 16 of a system 10. The mobile sensor device 16 is realized such that it can be disposed on a part of the body of an operator 22, in particular on an extremity of an operator 22 (FIG. 3). The mobile sensor device 16 is realized as a function device that can be disposed on an extremity of an operator 22. The mobile sensor device 16 is preferably realized as a smartband. The mobile sensor device 16 is preferably realized such that it can be disposed on an arm 32 of an operator 22 (FIG. 3). The mobile sensor device 16 comprises at least one sensor unit 34 for sensing at least one operator-specific characteristic quantity and/or at least one orientation-specific characteristic quantity.

The mobile sensor device 16 additionally comprises at least one fastening unit 36, which is designed to be disposed on the part of the body of the operator 22. The fastening unit 36 has an arm-band 30. The mobile sensor device 16 comprises the arm-band 30 for fastening to an arm 32 of an operator 22. The arm-band 30 is designed to be fastened to a wrist of the operator 22. The arm-band 30 is realized so as to be elastic. The arm-band 30 is realized as a silicone arm-band. The arm-band 30 is realized so as to be fully closed in the circumferential direction. The arm-band 30 can be slipped directly over the hand 28 of the operator 22, in order to be disposed on an arm 32 of the operator 22. In principle, however, it would also be conceivable for the arm-band 30 to be realized such that it can be closed by means of a further unit such as, for example, a housing unit and/or a closure. The arm-band 30 is designed to be fastened directly to an extremity, in particular the arm 32, of an operator 22. Also conceivable, however, are other designs of the fastening unit 36, considered appropriate by persons skilled in the art, such as, for example, as an ankle band, ring, glove or chest belt (FIG. 3).

Furthermore, the mobile sensor device 16 has a housing 44. The housing 44 is constituted by a plastic housing. In principle, however, another design, considered appropriate by persons skilled in the art, would also be conceivable. The housing 44 is inserted in a receiving region, not shown further, of the arm-band 30. The mobile sensor device 16 additionally has a display unit 46 and an operating unit 48. The display unit 46 is disposed in the housing 44. The display unit 46 has a display and a status light, each of which project from an opening in the housing 44. The operating unit 48 has an operating key that projects from an opening in the housing 44. The mobile sensor device 16 additionally has a computing unit 50. The computing unit 50 is designed to control the mobile sensor device 16. The computing unit 50 is disposed in the housing 44. The operating unit 48 and the display unit 46 are each electrically connected to the computing unit 50. Via the display unit 46, the operator 22 can be made aware, or a feedback and/or a status can be given, regarding why the power tool 12 has automatically adjusted or adapted in the application.

Figure 2:
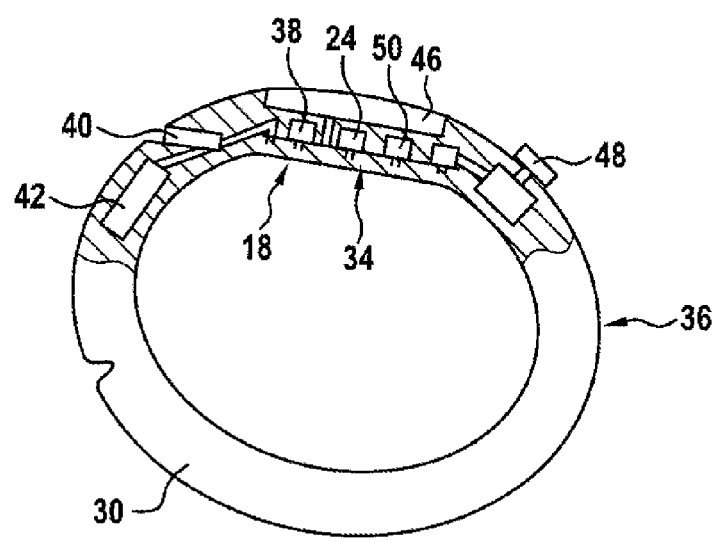
FIG. 2 illustrates the mobile sensor device with the sensor and the communication unit, in a schematic sectional representation.

The mobile sensor device 16 additionally has a communication unit 18. The communication unit 18 is disposed in the housing 44. Furthermore, the communication unit 18 is electrically connected to the computing unit 50. The communication unit 18 is designed to communicate with the power tool 12. The communication unit 18 is designed to establish a data connection between the power tool 12 and the mobile sensor device 16. The communication unit 18 has a wireless interface 38. The wireless interface 38 is constituted by a Bluetooth interface, in particular according to the Standard 4.0 Low Energy. In principle, however, a different interface, considered appropriate by persons skilled in the art, is also conceivable, such as, for example, a WLAN interface, in particular according to the Standard 801.11n, a Zigbee interface, an NFC interface, an RFID interface, a GSM interface, an LTE interface and/or a UMTS interface. The communication unit 18 additionally has a wire-bound interface 40. The wire-bound interface 40 is constituted by a USB connection. In principle, however, a different design of the wire-bound interface 40, considered appropriate by persons skilled in the art, is also conceivable. The wire-bound interface 40 is designed to connect the mobile sensor device 16 to an external device such as, in particular, a computer. Data can be loaded onto the mobile sensor device 16 via the wire-bound interface 40. In addition, the wire-bound interface 40 can be used to charge an energy storage means 42 of the mobile sensor device 16. The mobile sensor device 16 comprises the energy storage means 42. The energy storage means 42 is disposed in the housing 44 of the mobile sensor device 16. In addition, the electrical storage means 42 is electrically connected to the computing unit 50 (FIG. 2).

The mobile sensor device 16 is additionally designed to be disposed at least partly on an operator 22, for the purpose of sensing operator data. The mobile sensor device 16 is designed to sense vital data of the operator 22. For this purpose, the mobile sensor device 16 has a sensor unit 34. The sensor unit 34 is connected to the computing unit 50. The sensor unit 34 of the mobile sensor device 16 is designed, when disposed on the operator 22, to sense various operator data of the operator 22. The sensor unit 34 is designed to sense data of a behavior of an operator 22 and/or an operating burden, for example in the form of a noise burden and/or an oscillation burden, a pulse of an operator 22, a body temperature of an operator 22, a fatigue characteristic quantity of an operator 22, an alignment characteristic quantity and/or a movement characteristic quantity such as, in particular, accelerations. The sensor unit 34 is designed to sense a muscle frequency of the operator 22. From the frequency that the muscle system has when in tension, it is possible to deduce, in particular, whether the muscle, or the muscle system, is overloaded. A distinction is made in this case between twitching, also called fasciculation, and trembling, also called tremor. Twitching denotes the rhythmical movement, which cannot be deliberately influenced, by which one or more body parts and body functions may be affected. The involuntary movement is caused by the contraction of mutually counteracting muscle groups, in particular antagonistic muscles. An increased tremor may occur—usually temporarily—as a result of the influence of cold, stress, exhaustion, alcohol and other influencing factors. The sensor unit 34 in this case distinguishes the following frequency levels: 2 to 4 Hz corresponds to a low frequency level, 4 to 7 Hz corresponds to a medium frequency level, and >7 Hz corresponds to a high frequency level. Normal trembling is in the range of from 7 to 12 Hz; in the case of carrying a load such as, in particular a power tool 12, a frequency may fall somewhat. For this purpose, the sensor unit 34 may have various types of sensor. Preferably, the sensor unit 34 has an orientation sensor such as, in particular, a magnetic field sensor for sensing an orientation in space, a movement sensor, in particular for sensing a velocity, an acceleration and/or a rotation rate, a GPS sensor, in particular for sensing the X, Y and Z coordinates in relation to a ground surface, a pressure sensor such as, in particular, a strain gauge, a gas sensor, in particular for sensing a $CO_2$ or carbon monoxide component in an ambient air, a rotation rate sensor, a temperature sensor, in particular for sensing a body and/or ambient temperature, a voltmeter, a humidity sensor, a pH-value sensor, an air-pressure sensor such as, in particular, a barometer, and/or a pulse meter (FIG. 3).

The sensor unit 34 is additionally designed to monitor a pulse of the operator 22. Furthermore, the mobile sensor device 16 has a sensor 24. The sensor unit 34 comprises the sensor 24. The sensor 24 is designed to sense a vibration characteristic quantity. The sensor 24 is designed to sense vibrations acting on an operator 22. The sensor 24 is constituted by a vibration sensor. The sensor 24 is constituted by a piezoelectric vibration sensor. The computing unit 50 of the mobile sensor device 16 additionally has a storage memory element. Data of an operator 22 are stored on the storage memory element. The data can be transmitted onto the storage memory element via the wire-bound interface 40 of the communication unit 18. Personal data such as, for example, a weight, an age, a BMI, a medical record or the like of the operator 22 are stored on the storage memory element of the computing unit 50. Preferably, it can be determined, from the sensed data and from the stored personal data, what a healthy pulse is, and when the pulse attains a critical value for the operator 22. For this purpose, the sensor unit 34 can determine the pulse of the operator 22, for example, over the working day (FIG. 2).

The system 10 has a power tool 12. The power tool 12 is constituted by a hand-held power tool. The power tool 12 is constituted, for example, by an angle grinder. In principle, however, a different realization of the power tool 12, considered appropriate by persons skilled in the art, would also be conceivable. The power tool 12 has a sensor unit 14. The sensor unit 14 of the power tool 12 is designed to sense machine data. The sensor unit 14 of the power tool 12 is designed to sense operating characteristic quantities of the power tool 12. For this purpose, the sensor unit 14 has one or more sensors, which are designed to sense characteristic quantities of the power tool 12 during operation. The sensor unit 14 in this case senses of a drive unit, not shown further, of the power tool 12, such as, for example, a currently applied load, a current rotational speed and/or a current torque. The sensor unit 14 additionally senses general characteristic quantities of the power tool 12, such as, for example, a current vibration, oscillation, acceleration and/or temperature of the power tool 12. Also conceivable in principle, however, are other characteristic quantities, considered appropriate by persons skilled in the art, that can be sensed by the sensor unit 14. The sensor unit 14 has a sensor 26, which is designed to sense a vibration characteristic quantity of the power tool 12. The sensor 26 is constituted by a vibration sensor. The sensor 26 is constituted by a piezoelectric vibration sensor. The power tool 12 additionally has a communication unit 52 for communicating with a communication unit 18 of the mobile sensor device 16. The communication unit 52 has a wireless interface, which is constituted by a Bluetooth interface, in particular according to the Standard 4.0 Low Energy. In principle, however, a different interface, considered appropriate by persons skilled in the art, is also conceivable, such as, for example, a WLAN interface, in particular according to the Standard 801.11n, a Zigbee interface, an NFC interface, an RFID interface, a GSM interface, an LTE interface and/or a UMTS interface.

The sensor unit 14 of the power tool 12 and the mobile sensor device 16 are designed for redundant sensing of operating data. Some of the sensed operating data is therefore sensed both by the sensor unit 14 of the power tool 12 and by the mobile sensor device 16.

The system 10 additionally has a computing unit 20. The computing unit 20 is designed to compare measurement data of the sensor unit 14 of the power tool 12 and of the at least one mobile sensor device 16. The computing unit 20 is designed to effect data fusion of measurement data of the sensor unit 14 of the power tool 12 and of the at least one mobile sensor device 16. The computing unit 20 is designed to sense and evaluate operation-specific characteristic quantities, taking account of a history, environmental characteristic quantities, appliance characteristic quantities or the like, for the purpose of identifying, in particular predictively identifying, avoiding, or the like, work situations that may result in impairment to the health of the operator 22. The power tool 12 comprises the computing unit 20. The computing unit 20 is integrated in the power tool 12. The measurement data of the mobile sensor device 16 are transmitted to the computing unit 20 via the communication unit 18 of the mobile sensor device 16 and the communication unit 52 of the power tool 12.

The computing unit 20 is designed, when in an operating state, to check a plausibility of the measurement data of the sensor unit 14 of the power tool 12 and of the mobile sensor device 16. The checking of a plausibility of the measurement data of the sensor unit 14 of the power tool 12 is effected on the basis of the measurement data of the mobile sensor device 16. The computing unit 20 is designed to perform a plausibility check of the measurement data. Data and items of sensor information of the power tool 12, in combination with data of the mobile sensor device 16, can be used for a plausibility check.

The computing unit 20 is additionally designed to deduce a position of a hand 28, 28' of the operator 22 in dependence on the measurement data of the sensor unit 14 of the power tool 12 and of the mobile sensor device 16. The computing unit 20 is designed to use the measurement data of the sensor unit 14 of the power tool 12 and of the mobile sensor device 16 to check for a correct positioning of a hand 28, 28' of an operator 22. The computing unit 20 in this case may check, in particular, the position of the hand 28 on which the operator 22 is wearing the mobile sensor device 16. The computing unit 20 monitors a proximity sensor, not shown further, of the sensor unit 14 of the power tool 12. In principle, the sensor unit 14, instead of having the proximity sensor, may also have, for example, a touch-sensitive surface. The computing unit 20 then performs a plausibility check, as to whether the hand 28 of the operator 22 is actually at the correct position on the power tool 12. In principle, however, it is also advantageously possible to monitor two-handed operation, i.e. both hands 28, 28', by the use of a second mobile sensor device 16', each of the mobile sensor devices 16, 16' being worn on a respective wrist.

Furthermore, mobile sensor device 16 can also deduce the bearing and/or hold of the power tool 12 by the operator 22, for example whether the latter is operating the power tool 12 over the head. Data from the mobile sensor device 16, and additionally from the power tool 12, can be used for this purpose. If a hazardous handling and/or hold is identified, actions can be initiated.

The computing unit 20 is additionally designed to adjust safety settings of the power tool 12 in dependence on the measurement data of the sensor unit 14 of the power tool 12 and of the mobile sensor device 16. The computing unit 20 is designed to evaluate the measurement data for the purpose of predictively identifying and avoiding work situations that may result in impairment to the health of the operator 22. The computing unit 20 is designed to evaluate a history of the measurement data for the purpose of predictively identifying and avoiding work situations that may result in impairment to the health of the operator 22. The computing unit 20 in this case adjusts various safety settings of the power tool 12, such as, for example, the sensitivity for sensing of a kickback, a maximum torque and/or a maximum rotational speed. If, for example, it is detected by the computing unit 20 that there is a decline in attentiveness and/or operating strength—for example because of fatigue—and/or if a high vibration burden on the operator 22 is identified, a sensitivity of a kickback function is set by the computing unit 20 in such a manner that this function responds at an early stage, and/or a maximum torque and/or a maximum rotational speed of the power tool 12 limited in such a manner that only restricted operation remains possible. If, despite fatigue, the operator 22 requires the full power, an override button, not shown further, can be actuated on the power tool 12, so as to override the adjustments to the safety settings. The overriding of the safety settings may be time-limited or permanent, and this can also be represented via a display unit 46.

Figure 4:
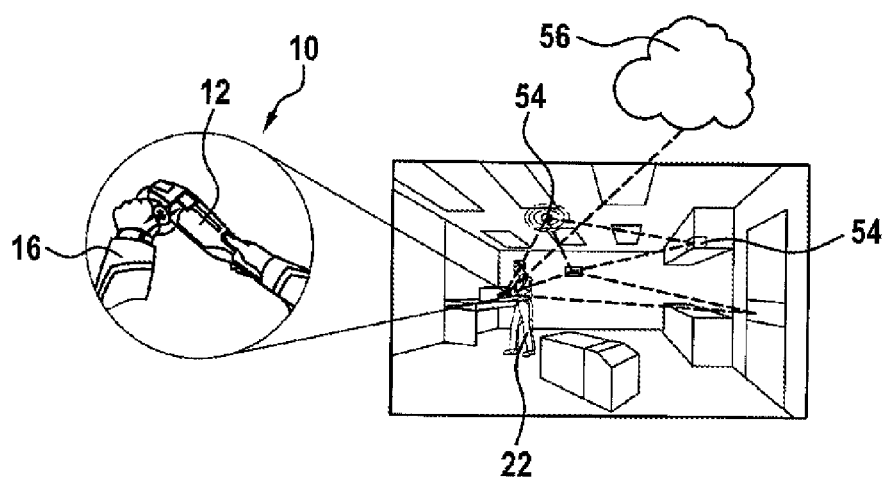
FIG. 4 illustrates the system with the mobile sensor device and the power tool, a plurality of appliances present in an environment, and a cloud, in a schematic representation.

In addition, further measurement data from devices 54 present in an environment may be included by the computing unit 20. Environmental characteristic quantities such as, for example, an ambient temperature, an air humidity or the like may be obtained from devices 54 of a space monitoring system such as, for example, fire alarms, air-conditioning equipment or the like, which characteristic quantities can likewise be taken into account and processed by the computing unit 20. Furthermore, the computing unit 20 is additionally designed to communicate with a network and/or a cloud 56. This enables the computing unit 20 to transmit data to the network and/or the cloud 56, such that the data can be stored there, evaluated and/or downloaded, for example to enable states or irregularities to be sensed and compared. Furthermore, the data in the cloud 56 may be used for a statistical evaluation (FIG. 4).

Figure 5:
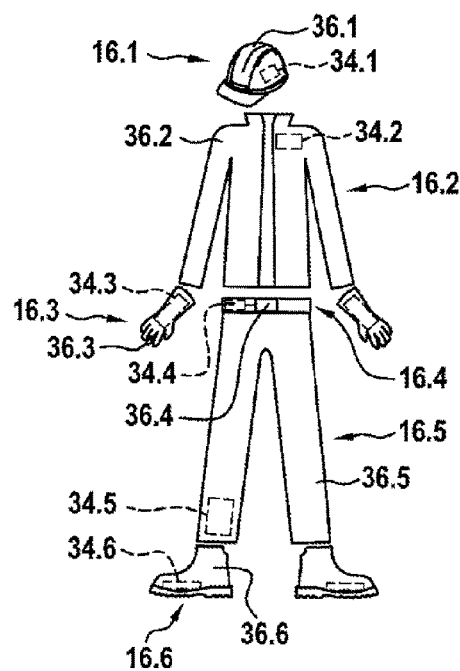
FIG. 5 illustrates further, alternative designs of the mobile sensor device of the system, in a schematic representation.

Further alternative designs of the mobile sensor device 16.1, 16.2, 16.3, 16.4, 16.5, 16.6 are shown in FIG. 5. The descriptions and the drawings that follow are limited substantially to the differences between the embodiments of the mobile sensor device 16, 16.1, 16.2, 16.3, 16.4, 16.5, 16.6, and in principle reference may also be made to the drawings and/or the description of the other embodiments, in particular of FIGS. 1 to 4, in respect of components that have the same designation, in particular in respect of components denoted by the same references. To distinguish the embodiments, the numbers 1 to 6 have been appended to the references of the embodiments in FIG. 5.

A plurality of alternative designs of the mobile sensor device 16.1, 16.2, 16.3, 16.4, 16.5, 16.6, in the form of differing items of work clothing, are shown in FIG. 5. The differing items of work clothing, which each constitute a mobile sensor device 16.1, 16.2, 16.3, 16.4, 16.5, 16.6, together constitute a personal protective equipment for a user. The items of work clothing are constituted by a jacket, trousers, gloves, safety shoes, a belt and a helmet. Also conceivable are other designs considered appropriate by persons skilled in the art, such as, for example, a protective vest, cap, hood, ear defenders, protective goggles and/or chest belt. The mobile sensor devices 16.1, 16.2, 16.3, 16.4, 16.5, 16.6 each have a respective fastening unit 36.1, 36.2, 36.3, 36.4, 36.5, 36.6, each respectively constituted by the item of work clothing. Moreover, the mobile sensor devices 16.1, 16.2, 16.3, 16.4, 16.5, 16.6 each have at least one respective sensor unit 34.1, 34.2, 34.3, 34.5, 34.6. The sensor unit 34.1, 34.2, 34.3, 34.5, 34.6 is in each case integrated into the associated fastening unit 36.1, 36.2, 36.3, 36.4, 36.5, 36.6. The sensor unit 34.1, 34.2, 34.3, 34.5, 34.6 is in each case designed to sense at least one operator-specific characteristic quantity and/or at least one orientation-specific characteristic quantity. For this purpose, the sensor unit 34.1, 34.2, 34.3, 34.5, 34.6 in each case may have various types of sensor. Preferably, the sensor unit 34.1, 34.2, 34.3, 34.5, 34.6 has an orientation sensor such as, in particular, a magnetic field sensor for sensing an orientation in space, a movement sensor, in particular for sensing a velocity, an acceleration and/or a rotation rate, a GPS sensor, in particular for sensing the X, Y and Z coordinates in relation to a ground surface, a pressure sensor such as, in particular, a strain gauge, a gas sensor, in particular for sensing a $CO_2$ and/or carbon monoxide component in an ambient air, a rotation rate sensor, a temperature sensor, in particular for sensing a body and/or ambient temperature, a voltmeter, a humidity sensor, a pH-value sensor, an air-pressure sensor such as, in particular, a barometer, and/or a pulse meter. In addition, the mobile sensor devices 16.1, 16.2, 16.3, 16.4, 16.5, 16.6 each have a communication unit, not shown further, a computing unit, not shown further, a display unit, not shown further, an operating unit, not shown further, and an energy storage means, not shown further.

Figure 6:
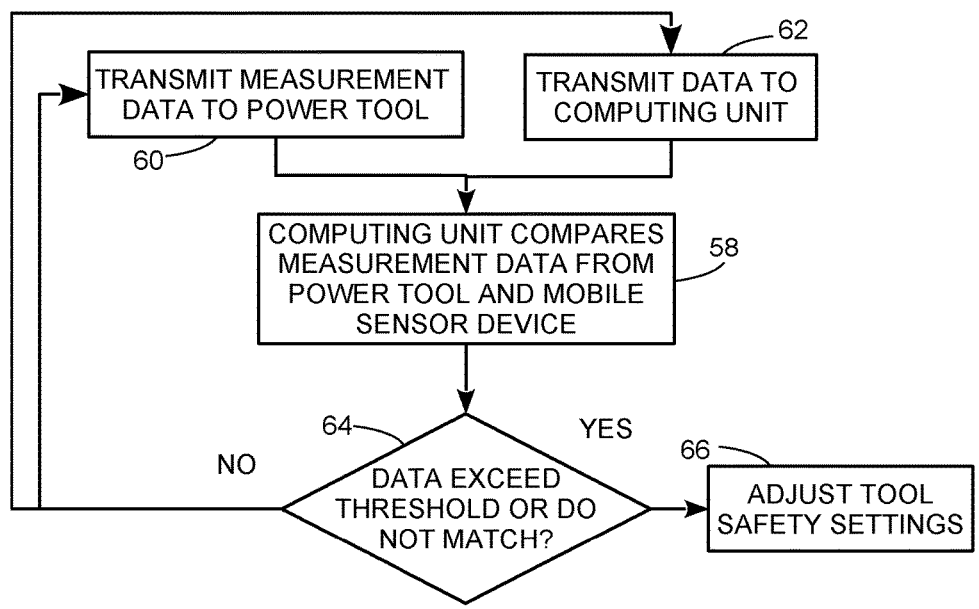
FIG. 6 illustrates a schematic flow diagram of a method for operating the system.

FIG. 6 shows a flow diagram of a method for operating the system 10.

During the method, in a step 58, the computing unit 20 of the system 10 compares measurement data of the sensor unit 14 of the power tool 12 and of the mobile sensor device 16, 16.1, 16.2, 16.3, 16.4, 16.5, 16.6. For this purpose, the measurement data of the mobile sensor device 16, 16.1, 16.2, 16.3, 16.4, 16.5, 16.6 are transmitted to the power tool 12 in a preceding step 60 by means of the communication unit 18 of the mobile sensor device 16, 16.1, 16.2, 16.3, 16.4, 16.5, 16.6, and then to the computing unit 20. In addition, likewise in a step 62 that precedes the step 58, the measurement data of the sensor unit 14 of the power tool 12 are transmitted onto the computing unit 20. In a branch 64 that follows the step 58, it is checked by the computing unit 20 whether the measurement data exceed predefined threshold values, or whether the measurement data of the sensor unit 14 of the power tool 12 match the measurement data of the mobile sensor device 16, 16.1, 16.2, 16.3, 16.4, 16.5, 16.6. If the threshold values are not exceeded, and the measurement data match, the step 60 and the step 62 are repeated. If the threshold values are exceeded, or the measurement data do not match, there follows a step 66. In the step 66, the safety settings of the power tool 12 of the system 10 are adjusted in dependence on the measurement data of the sensor unit 14 of the power tool 12 and of the mobile sensor device 16, 16.1, 16.2, 16.3, 16.4, 16.5, 16.6. In this case, for example, the sensitivity for sensing of a kickback is increased, a maximum torque is reduced and/or a maximum rotational speed is reduced.

What is claimed is:

1. A system comprising:
    a power tool having a sensor unit including a first sensor integrated with the power tool that measures machine data in the power tool;
    a mobile sensor device separate from the power tool having a second sensor that measures operator data from an operator of the power tool and a communication unit comprising at least one of a wire-bound or a wireless interface configured to communicate with the power tool, wherein the mobile sensor device is configured to be disposed at least partly on an operator; and
    a computing unit integrated in the power tool, the computing unit being configured to compare the machine data from the sensor unit of the power tool and the operator data from the mobile sensor device.

2. The system according to claim 1, wherein the first sensor in the sensor unit of the power tool and the second sensor in the mobile sensor device are both configured to sense a vibration characteristic quantity.

3. The system according to claim 1, wherein the first sensor in the sensor unit of the power tool and the second sensor in the mobile sensor device are configured for redundant sensing of operating data.

4. The system according to claim 1, wherein the computing unit is configured to determine a position of a hand of an operator based on the machine data from (i) the sensor unit of the power tool and (ii) the operator data from the mobile sensor device.

5. The system according to claim 1, wherein the computing unit is configured to adjust safety settings of the power tool based on both of (i) the machine data from the sensor unit of the power tool and (ii) the operator data from the mobile sensor device.

6. A mobile sensor device of a system, comprising:
    a communication unit comprising at least one of a wire-bound or a wireless interface configured to communicate with a power tool that is separate from the mobile sensor device;
    a fastener configured to dispose the sensor unit on a body of an operator of the power tool; and
    a first sensor configured to measure operator data from the operator of the power tool while the mobile sensor device is disposed on the body of the operator;
    wherein the mobile sensor device is included in a system having:

the power tool including at least one sensor unit including a second sensor that measures machine data in the power tool; and a computing unit integrated in the power tool, the computing unit being configured to:
compare the machine data of the at least one sensor unit of the power tool and the operator data of the at least one mobile sensor device.

7. The mobile sensor device according to claim 6, the fastener further comprising:
at least one arm-band configured to fasten to an arm of an operator.

8. A method for operating a system, comprising:
generating machine data corresponding to a power tool using a first sensor in a sensor unit of the power tool;
generating operator data corresponding to an operator of the power tool using a second sensor in a mobile sensor device that is separate from the power tool, wherein the mobile sensor device is configured to be disposed at least partly on an operator;
comparing, with a computing unit in the power tool, the machine data from the sensor unit of the power tool and the operator data that is transmitted from the mobile sensor device using at least one of a wire-bound or a wireless interface in a communication unit in the mobile sensor device.

9. The method according to claim 8, wherein a safety setting of the power tool of the system is adjusted based on both of (i) the machine data from the sensor unit of the power tool and (ii) the operator data from the mobile sensor device.

10. The system according to claim 1, wherein the power tool is a hand-held power tool.

11. The system of claim 2, the computing unit being further configured to:
identify that the power tool is operated by the operator only in response to redundant sensing of the vibration characteristic quantity from both the first sensor in the power tool and the second sensor in the mobile sensor device.

12. The system of claim 1, the second sensor further comprising a pulse sensor and the computing unit being further configured to:
detect that a pulse level of the operator has exceeded a predetermined limit during operation of the power tool based on the machine data from the first sensor in the power tool and a pulse measurement in the operator data from the second sensor in the mobile sensor device; and
adjust a safety setting of the power tool in response to the determination that the pulse level of the operator has exceeded the predetermined limit.

* * * * *